W. W. CRANFORD.
AGRICULTURAL IMPLEMENT.
APPLICATION FILED AUG. 9, 1913.
1,137,052.
Patented Apr. 27, 1915.
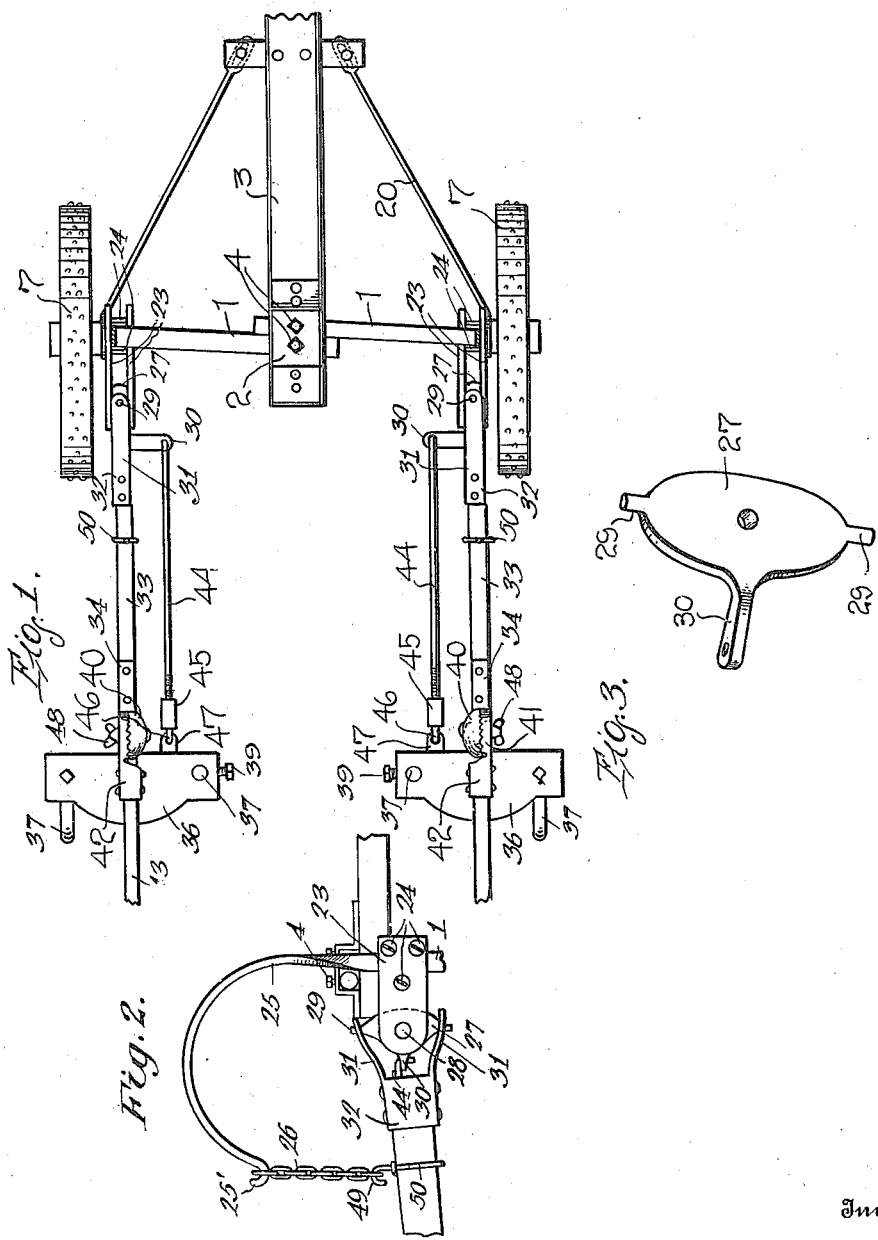
Witnesses
Robert M. Gutphard.
A. I. Hurt.
Inventor
W.W. CRANFORD
By Watson E. Coleman
Attorney
THE NORRIS PETERS CO., WASHINGTON, D. C.

UNITED STATES PATENT OFFICE.

WILLIAM W. CRANFORD, OF JOHNSON COUNTY, NEAR ALTUS, ARKANSAS.

AGRICULTURAL IMPLEMENT.

1,137,052.  Specification of Letters Patent.  Patented Apr. 27, 1915.

Application filed August 9, 1913. Serial No. 784,007.

*To all whom it may concern:*

Be it known that I, WILLIAM W. CRANFORD, a citizen of the United States, residing in Johnson county, Arkansas, near Altus, in the county of Franklin and State of Arkansas, have invented certain new and useful Improvements in Agricultural Implements, of which the following is a specification, reference being had to the accompanying drawings.

This invention comprehends certain new and useful improvements in agricultural implements and relates more specifically to cultivators.

An object of the invention is to provide a cultivator of improved and simplified construction and in which the plow points or other instruments may be adjustably mounted and secured to the axle.

Another object is to provide novel and improved supporting means for the implements, whereby the same may be readily adjusted and retained in adjusted position.

A further object is to provide novel means for mounting the hubs of the ground wheels upon the outwardly directed ends of the sectional arched axle.

Another object is to generally improve and simplify the construction and operation of the various parts of the implement and increase the efficiency of the same.

With the above and other objects in view, my invention consists in certain novel constructions, combinations, and arrangements of parts to be hereinafter more fully described, claimed, and illustrated in the accompanying drawings, in which, Figure 1 is a view in top plan of an agricultural implement constructed in accordance with an embodiment of my invention; Fig. 2 is a fragmentary view in elevation of the device as disclosed in Fig. 1 and illustrating in detail certain features of my invention as embodied herein; and Fig. 3 is a view in perspective enlarged of a coupling member herein included.

Referring more specifically to the drawings in which similar reference characters designate corresponding parts throughout the several views, 1 designates the axle sections, which are formed in such manner as to produce an arched axle, the upper end of the axle sections being adjustably engaged through a bearing member 2 secured upon the rear end of the tongue 3, said sections being secured in adjusted position by the set screws 4ª.

Secured to the vertical portions of the axle sections 1 are the bracket members 23. The bracket members 23 are arranged in pairs and are clamped upon opposite sides of the axle members, by clamping bolts 24 or other suitable means, as clearly shown in Fig. 1. The lower end of a curved supporting member 25 is also clamped between each pair of bracket members 23 and a hook 25' is formed on the opposite free curved end of each member 25, as also clearly shown in Fig. 1. The purpose of the members 25 will presently appear.

Between the rear ends of each pair of bracket members 23 is pivoted a swiveled head or coupling member 27, upon a pivot pin 28. The member 27 is preferably of substantially oval form and has the upper and lower reduced extensions 29 projecting from its opposite ends and a curved arm 30 projecting from the rear edge of said member about midway the ends of the same. The spaced arms 31 projecting forwardly from the sleeve 32 are secured to the reduced extensions 29. The sleeve 32 is secured upon the forward end of a beam 33 which has the bracket plates 34 secured upon its rear end and projecting rearwardly therefrom.

An implement supporting head 36 is pivoted centrally between the plates 34 and has the standards 37 of the implements 38 secured therein. The plate 34 has an upwardly directed perforated concavo-convex ear 40 having its concave face corrugated, as shown in Fig. 1, for engagement by the convex face of the extended perforated concavo-convex end 41 of the socket 42 which has the lower end of the handle 43 secured therein, by means of which the depth of the implements 38 may be regulated, or the handle 43 turned with respect to the beam 33. The position of the head 36 may be readily adjusted by means of the rod 44 which has one end secured in the curved end 30 of the member 27 while the opposite end of said rod is secured in the adjusting sleeve 45 within which is also adjustably secured one end of a short rod 46, which has its opposite end secured in the ear 47 carried by the head 36. It will be understood that the handle 43 is secured in adjusted position by the set screw 48 engaged through the concavo-convex ear 40 and the reduced extended concavo-convex portion 41 of the socket 42. A member 50 is engaged around each beam 33, beneath the free end of the member 25 and has the lower end of a chain 26 engaged in its hooked upper end 49, while the opposite end of the chain is secured over the hook 25' formed on the free end of the member 25. It will be understood that by engaging the proper link of the chain 26 with the hook 25', the free end of the member 25 will be drawn downwardly and the member 25 placed under tension, upon engagement of the implements 38 with the ground, thereby placing the implements under proper tension and making it necessary for the operator to exert a downward pressure upon the handles 43 to retain the points of the implements 38 the proper distance within the ground during operation of the device. It will also be evident that when the implement is not in use, the beams 33 may be suspended in raised position by engaging the proper links of the chains 26 with the hooks 25'.

From the foregoing, it will be understood that I have provided an agricultural implement of improved and simplified construction and in which various parts may be readily adjusted and secured in their adjusted positions.

It will further be apparent that the device will be highly efficient and effective in use and should any of the parts become worn or broken, they may be readily replaced at an extremely small cost.

While I have shown the preferred form of my implement, it will be understood that minor changes in the details of construction may be made within the scope of the appended claims without departing from the spirit of my invention or sacrificing any of the advantages of the same.

What I claim is:—

1. In combination with a supporting axle, a beam, a coupling member interposed between the beam and axle and pivotally engaged therewith, an angular arm projecting laterally from the coupling member intermediate the length thereof, a vertically pivoted implement supporting member carried by the beam, an ear projecting forwardly from the implement supporting member to one side of its pivot, a sleeve operatively engaged with the ear, and a rod operatively connected to the angular extension of the coupling member and adjustably engaged with the sleeve.

2. In combination with a supporting axle, a beam, a coupling member interposed between the beam and axle and pivotally engaged therewith, an angular arm projecting laterally from the coupling member intermediate the length thereof, a vertically pivoted implement supporting member carried by the beam, and a rod operatively connected to the angular extension of the coupling member and with the implement supporting member.

In testimony whereof I hereunto affix my signature in the presence of two witnesses.

WILLIAM W. CRANFORD.

Witnesses:
E. E. CASTLEBERRY,
J. H. CASTLEBERRY.

Copies of this patent may be obtained for five cents each, by addressing the "Commissioner of Patents, Washington, D. C."